United States Patent

Bohner et al.

Patent Number: 6,012,540
Date of Patent: Jan. 11, 2000

[54] VEHICLE STEERING SYSTEM UTILIZING DESIRED-VALUE-DEPENDENT CONTROL SEGMENT

[75] Inventors: Hubert Bohner, Boeblingen; Martin Moser, Fellbach, both of Germany

[73] Assignee: DaimlerChrysler AG, Germany

[21] Appl. No.: 08/844,680

[22] Filed: Apr. 21, 1997

[30] Foreign Application Priority Data

Apr. 25, 1996 [DE] Germany ............. 196 16 437

[51] Int. Cl.[7] .................................................. B62D 5/00
[52] U.S. Cl. ............................ 180/402; 180/422; 701/41
[58] Field of Search .................................. 180/403, 417, 180/421, 422, 402; 701/41, 42

[56] References Cited

U.S. PATENT DOCUMENTS

| | | | |
|---|---|---|---|
| 3,690,400 | 9/1972 | Uchiyama et al. | 180/446 |
| 4,557,342 | 12/1985 | Drutchas | 180/444 |
| 5,151,860 | 9/1992 | Taniguchi et al. | 180/142 |
| 5,201,380 | 4/1993 | Callahan | 180/142 |
| 5,549,173 | 8/1996 | Tomita | 180/417 |

FOREIGN PATENT DOCUMENTS

| | | |
|---|---|---|
| 0 261 325 A2 | 3/1988 | European Pat. Off. . |
| 237 639 A1 | 7/1986 | Germany . |
| 38 23 413 A1 | 1/1990 | Germany . |
| 41 10 148 A1 | 10/1991 | Germany . |
| 92 05 781 | 7/1992 | Germany . |
| 60-35666 | 2/1985 | Japan . |
| 62-178273 | 11/1987 | Japan . |
| 4-176776 | 6/1992 | Japan . |
| 4-176777 | 6/1992 | Japan . |

*Primary Examiner*—Paul N. Dickson
*Assistant Examiner*—Lynda Jasmin
*Attorney, Agent, or Firm*—Evenson, McKeown, Edwards & Lenahan, P.L.L.C.

[57] ABSTRACT

A vehicle steering system has a desired-value generator arrangement which is actuated by a manual steering device. The desired-value generator arrangement is connected with a hydraulic actuating unit for the steered vehicle wheels by a regulating system. A modified PD control, along with taking a control segment into account, provides a precise operation of the actuating unit analogously to the operation of the manual steering device.

19 Claims, 2 Drawing Sheets

VEHICLE STEERING SYSTEM UTILIZING DESIRED-VALUE-DEPENDENT CONTROL SEGMENT

BACKGROUND AND SUMMARY OF THE INVENTION

This application claims the priority of 196 16 437.0, the disclosure of which is expressly incorporated by reference herein.

The present invention relates to a vehicle steering system having a manual steering device, particularly a manual steering wheel operated by the driver, and steered vehicle wheels operatively connected therewith, in which a desired-value generator arrangement is operated and the steered vehicle wheels are operated by a hydraulic actuator. The latter is, in turn, controlled by an electrically operated solenoid valve arrangement whose electric valve flow is dependent on a regulating segment determined by the desired value—actual value comparison of the steering angle or of a quantity correlated therewith.

In conventional steering systems of passenger cars, the manual steering wheel and the steered vehicle wheels are mechanically positively coupled with one another for a steering operation. It is also basically known, particularly from airplane construction, to control landing flaps and tail surfaces whereby the pilot operates only a desired-value generator via a manual control device. The desired-value generator is then operatively connected by way of an electronically operating regulating system with the landing flaps or the tail surfaces. This concept, which is also called "fly by wire", has become so reliable that it is even used for passenger planes.

Basically, corresponding concepts can assumedly be used and are advantageous also for vehicle steering systems. This is particularly so because then the space otherwise required for the steering column and the mechanical positive coupling between the manual steering wheel and the steered wheels can thus be used for a different purpose and no longer has to be taken into account in developing or designing the vehicle. In addition, the risk of injury for the driver is reduced in the case of an accident because of the elimination of the steering column.

DE 38 23 413 A1 discloses a vehicle steering system of the aforementioned type, particularly for unmanned transport vehicles which are used, for example, in production facilities and are controlled by inductively operating vehicle guiding systems. In order to keep the energy requirement of the known vehicle steering system low, the hydraulic system pressure is adapted to the respective requirements. As a rule, the hydraulic system pressure has a comparatively low value which is increased if a desired-value actual-value difference cannot otherwise be controlled. This vehicle steering device therefore operates with a certain sluggishness which, however, can be tolerated in view of the always slow travelling speed of the unmanned transport systems.

DD 237 639 A1 and DE 92 05 781 U1 show electrohydraulic steering systems, particularly for agricultural machines and tractors or motor vehicle rear axles. In these applications, PID controllers can be used.

It is an object of the present invention to provide a particularly advantageous embodiment of a steering system in which the steering system is usable for normal road vehicles with a driver and passenger.

This object has been achieved in accordance with the present invention by additionally controlling electric valve current as a function of a desired-value-dependent control segment. The control segment is preferably proportional to the rate of change of the desired value.

The invention is based on the general recognition of using construction elements which are as known and reliable as possible, in the present embodiment, hydraulic actuators and solenoid valves. With respect to the regulating system between the manual steering device and the steered vehicle wheels, the present invention is also based on the concept of already permitting as the result of the control segment, a rough adjustment which takes place without any delay by way of a desired-value actual-value comparison while only the precision adjustment takes place by way of a regulating segment determined by the desired-value actual-value comparison.

Because the control segment is preferably proportional to the rate of change of the desired value, particularly with rapid steering maneuvers (e.g., when a suddenly occurring obstacle has to be avoided), a particularly delay-free operation of the steered vehicle wheels is ensured.

The regulating segment preferably comprises a proportional segment as well as, above a threshold value of the regulating difference, a differential segment of the regulating difference. Because of the fact that in the event of slight regulating differences no differential segment is taken into account, a comfortable vehicle handling is ensured particularly with possible vibrations of the vehicle (e.g., wheel imbalances). In particular, it is ensured that the regulating does not increase the occurring vibrations.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
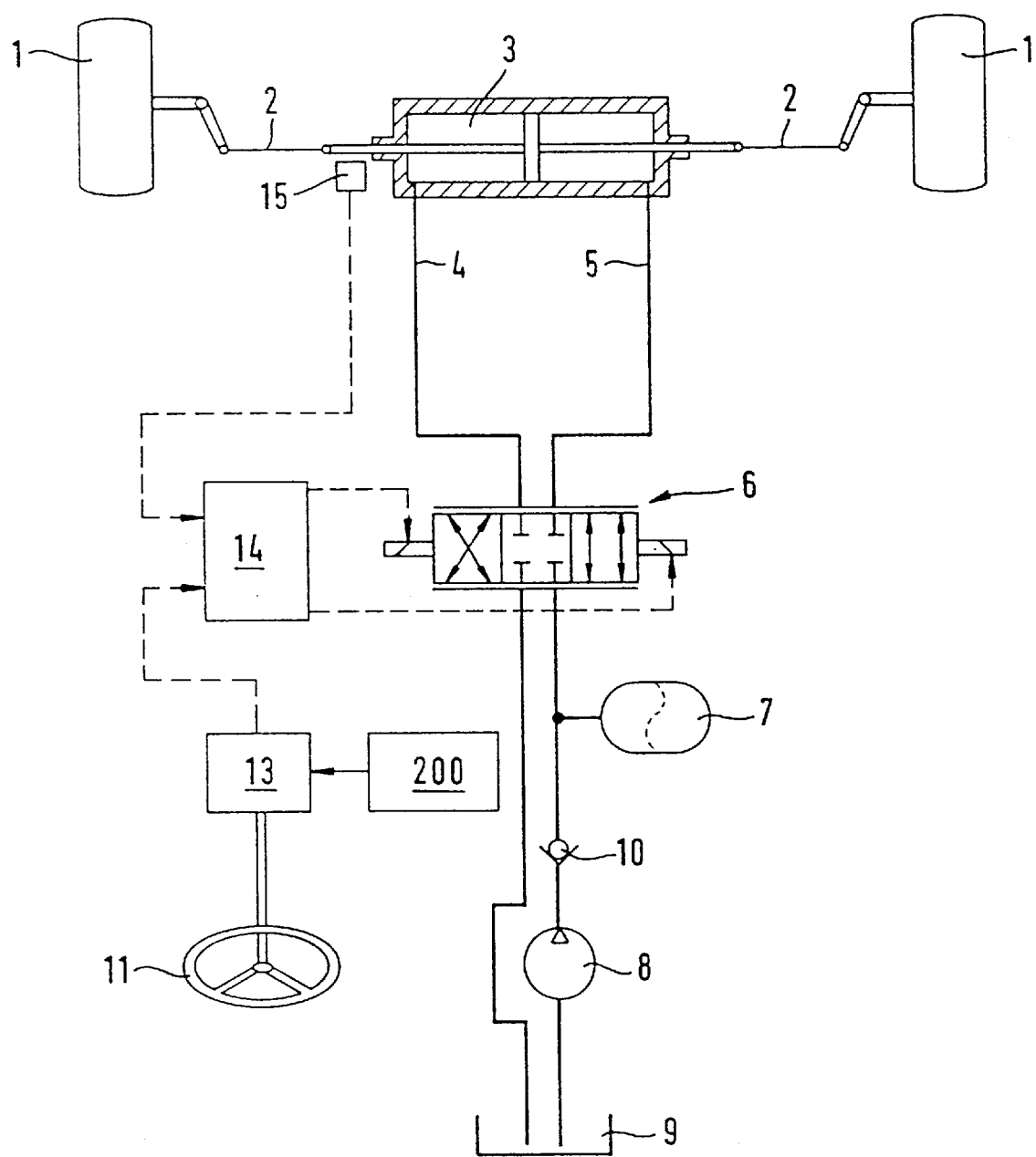
FIG. 1 is a schematic overall representation of the vehicle steering system according to the present invention.

In FIG. 1, a motor vehicle has at least one axle with steered vehicle wheels 1 which are mechanically positively coupled by tie rods 2 or the like with a hydraulic actuating unit 3 which, in the illustrated embodiment, is constructed as a double-acting piston-cylinder unit. This piston-cylinder unit 3 has two hydraulic chambers which are separated from one another by its piston and which are connected by way of lines 4, 5 with an electromagnetically operable proportional valve 6. The valve 6 is connected, on one hand, with a hydraulic pressure accumulator 7, which is continuously held at a predetermined pressure by a hydraulic pump 8, and, on the other hand, with a hydraulic reservoir 9 to which the suction side of the pump 8 is also connected. In order to prevent a discharge of the pressure accumulator 7, in the event of an inoperative pump 8, a return valve 10 is arranged between the pump 8 and the pressure accumulator 7.

The pressure of the pressure accumulator 7 is dimensioned such and the proportional valve 6 is configured such that the respective hydraulic current is proportional to the electric valve current. Thus, the actuating speed of the actuating unit 3 is proportional to the electric valve current.

A manual steering wheel 11 operated by the motor vehicle driver controls a desired-value generator 13 which generates an electric signal reflecting the angle of rotation of the manual steering wheel 11 and transmits that signal to an input of a conventional electronic regulating circuit 14. Another input of the regulating circuit 14 is connected with a sensor 15 whose signal represents the stroke of the piston-cylinder unit 3. On the output side, the regulating circuit 14 controls the actuating magnets of the proportional valve 6.

The desired-value generator 13 can optionally have an input which receives signals of an autonomous control 200 which, for example, can automatically hold the vehicle on a track to be given or of carrying out steering corrections in the case of side winds gusts.

Figure 2:
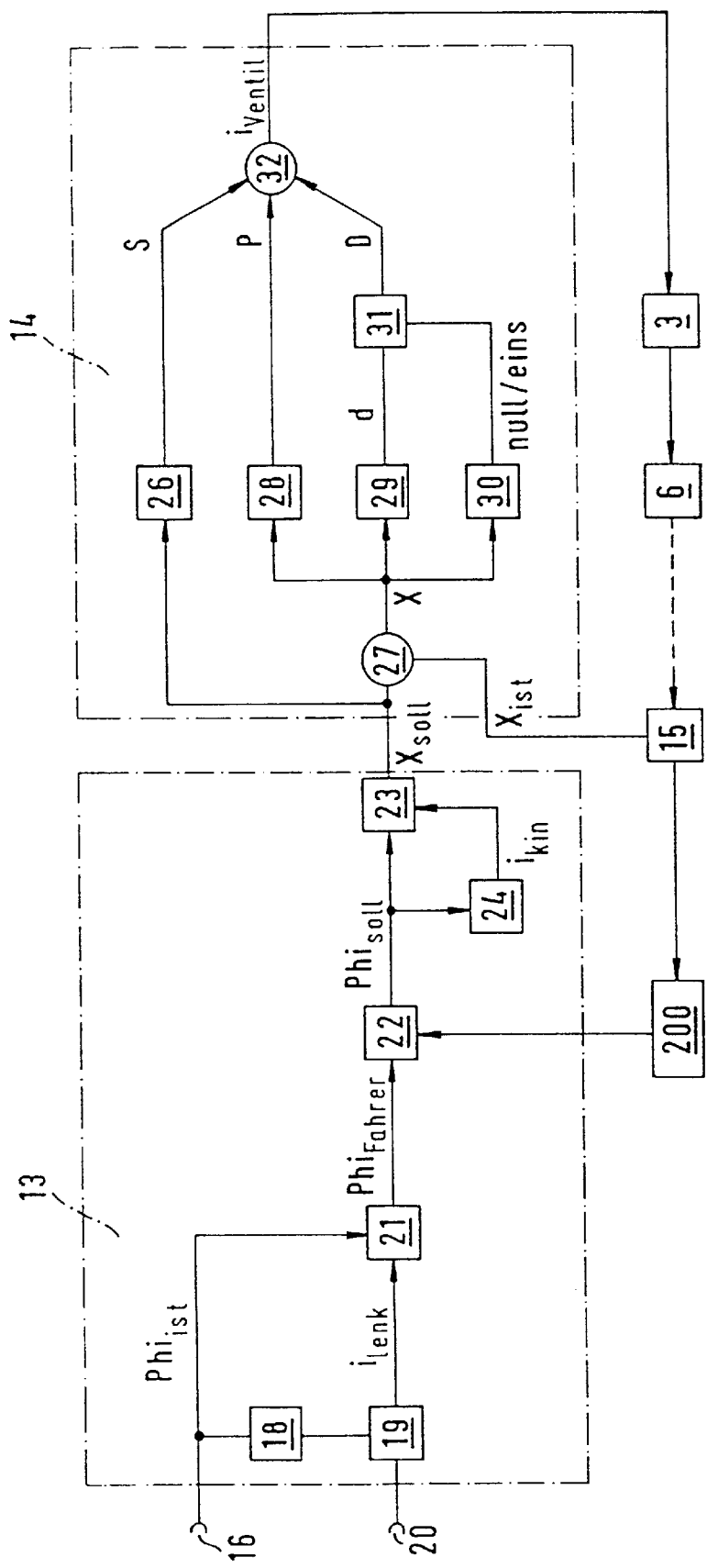
FIG. 2 is a block diagram of the desired-value generator and of the regulating system used in the system of FIG. 1.

In FIG. 2, the illustrated desired-value generator 13 has an input 16 which is connected with a conventional rotating-angle generator operated by the manual steering wheel 11. This rotating angle generator generates a signal $Phi_{actual}$ which reflects the rotating angle of the manual steering wheel. This signal is supplied to a stage or unit 18 whose output signal represents the difference between the center position of the manual steering wheel and the respectively adjusted rotating position of the manual steering wheel 11.

On the output side, the stage or unit 18 is connected with a stage 19 whose additional input 20 continuously receives signals representative of the driving speed. As a result, the stage 19 generates a signal $i_{steer}$ ($i_{lenk}$) on the output side which represents a speed-dependent transmission ratio between the rotating angle of the manual steering wheel 11 and the steering angle of the steered vehicle wheels 1.

This signal $i_{steer}$ ($i_{lenk}$) is transmitted to an input of a divider 21 which, in addition, is connected with the input 16 and correspondingly receives the signals $Phi_{actual}$ ($Phi_{ist}$) which represent the rotating angle of the manual steering wheel 11. The dividing linking of the signals $Phi_{actual}$ ($Phi_{ist}$) and $i_{steer}$ ($i_{lenk}$) generates, a signal $Phi_{driver}$ ($Phi_{fahrer}$) which can be understood as a driver-side steering angle indication for the steered vehicle wheels 1.

This signal is transmitted to an adding stage or unit 22 which, in addition, receives signals of an autonomous steering control 200 whose signals may, for example, represent steering corrections for the compensation of side wind influences or other steering indications. For example, these signals may also represent the "desired" steering angle of the steered vehicle wheels 1 if the vehicle is to automatically following a given track.

On the output side of the adding stage or unit 22, a signal $Phi_{desired}$ ($Phi_{soll}$) will now be present, which represents the desired value of the steering angles of the steered vehicle wheels 1. On one hand, this signal is supplied directly to an input of a multiplier 23 whose other input is connected with a stage or unit 24 which, on the input side, also receives the signal $Phi_{desired}$ ($Phi_{soll}$). In stage or unit 24, the kinematics of the drive transmission between the actuating unit 3 (compare FIG. 1) and the steered vehicle wheels 1 are now taken into account. As a rule, the steering angle of the steered vehicle wheels 1 is not exactly linearly proportional to the actuating stroke of the actuating unit 3. In stage or unit 24, a signal $i_{kin}$ is therefore generated which can be understood to be a correction factor.

The signal $i_{kin}$ and the signal $Phi_{desired}$ ($Phi_{soll}$) are now multiplicatively linked with one another in the multiplier 23 so that on the output side a signal $x_{desired}$ ($X_{soll}$) is present which represents that desired value of the actuating stroke of the actuating unit 3 which, because of the respective kinematics of the drive transmission between the actuating unit 3 and the steered vehicle wheels 1, corresponds to the respective desired value $Phi_{desired}$ ($Phi_{soll}$). of the steering angle of the steered vehicle wheels.

The signal $x_{desired}$ ($X_{soll}$) forms the output signal of the desired value generator 13 and the input signal of the controller 14. In the controller 14, the signal $x_{desired}$ ($X_{soll}$) is, on one hand, supplied to a differentiating stage or unit 26 which, on the output side, generates an output S which is a function of the rate of change of the desired value $x_{desired}$ ($X_{soll}$). On the other hand, the signal $x_{desired}$ ($X_{soll}$) is supplied to a comparator 27 which compares this signal with the actual value $x_{actual}$ ($X_{ist}$) of the actuating stroke of the actuating unit 3. This signal $x_{actual}$ ($X_{ist}$) is generated by the sensor 15 (compare FIG. 1).

On the output side, the comparator 27 generates a signal X which reflects the regulating difference; that is, the difference between $x_{desired}$ ($X_{soll}$) and $x_{actual}$ ($X_{ist}$). This signal X is processed by a modified PD-control. For this purpose, in a stage 28, which on the input side receives the signal X, a signal P is generated which is proportional to the regulating difference. In addition, in a differentiating stage or unit 29, which also receives the signal X, a signal d is generated which is proportional to the rate of change of the regulating difference X.

In addition, the regulating difference X is supplied to a stage or unit 30 which, on the output side, generates a "zero" signal if the amount of the regulating difference X is below a first threshold value. If the amount of the regulating difference X is above a second threshold value which is higher than the first threshold value, the stage 30 generates a signal "one" on the output side. If, with respect to its amount, the regulating difference X is between the two threshold values, a signal is generated on the output side by the stage 30 which is between "zero" and "one" and increases as the amounts of the regulating differences rise.

In a multiplier 31, the signal d and the output signals of stage 30 are multiplicatively linked with one another so that a signal D is generated on the output side. If, with respect to its amount, the regulating difference X is above the second threshold value, the signal D corresponds to the signal d. If, with respect to its amount, the regulating difference X is lower than the first threshold value, the signal D corresponds to the signal "zero". If, with respect to its amount, the regulating difference X is between the two threshold values, the signal D represents a value between "zero" and the value represented by the signal d.

The signal S, which represents a control segment, and the signal P which represents a proportional regulating segment, as well as the signal D, which represents a modified differential regulating segment, are additively linked with one another in an adder 32 whose output signal represents the electric valve current $i_{valve}$ ($i_{ventil}$) for the actuating magnets of the proportional valve 6. Thus, as the result, the signal $i_{valve}$ ($i_{ventil}$) controls the actuating unit 3 whose actuating stroke is monitored by the sensor 15 which correspondingly generates the signal $x_{actual}$ ($X_{ist}$) which reflects the actual position of the actuating unit 3 and is supplied to the comparator 27, as mentioned above. This signal can also be supplied to the autonomous control 200 for special driving conditions.

Although the invention has been described and illustrated in detail, it is to be clearly understood that the same is by way of illustration and example, and is not to be taken by way of limitation. For example, the differentiating stages 26, 29 can be formed by correspondingly coordinated high-pass filters. Therefore, the spirit and scope of the present invention are to be limited only by the terms of the appended claims.

What is claimed is:

1. A vehicle steering system, comprising:
   a manual steering device, configured to be operated by a vehicle driver,
   steered vehicle wheels operatively connected with the steering device,
   a desired-value generator actuatably connected with the steering device, and
   a hydraulic actuating drive operationally connected with the vehicle and configured to be controlled by an electrically actuated valve configured such that an electric valve current thereof is dependent on a regulating segment determined by a desired-value actual-value comparison of the steering angle or a quantity correlated therewith, and the electric valve current is controlled as a function of a desired-value-dependent control segment,
   wherein the control segment is proportional to a chance rate of a desired value.

2. The vehicle steering system according to claim 1, wherein the regulating segment comprises a proportional segment and, above a threshold value of a regulating difference, a differential segment of the regulating difference.

3. The vehicle steering system according to claim 2, wherein the control segment is proportional to a change rate of a desired value.

4. The vehicle steering system according to claim 1, wherein the electric valve current is proportional to an actuating speed of the hydraulic actuating drive.

5. The vehicle steering system according to claim 4, wherein the control segment is proportional to a change rate of a desired value.

6. The vehicle steering system according to claim 5, wherein the regulating segment comprises a proportional segment and, above a threshold value of a regulating difference, a differential segment of the regulating difference.

7. The vehicle steering system according to claim 1, wherein the desired-value generator is configured to operate as a function of driving speed such that, according to a product, the desired value is a function of a position of the manual steering device and the driving speed.

8. The vehicle steering system according to claim 7, wherein the control segment is proportional to a change rate of a desired value.

9. The vehicle steering system according to claim 8, wherein the regulating segment comprises a proportional segment and, above a threshold value of a regulating difference, a differential segment of the regulating difference.

10. The vehicle steering system according to claim 9, wherein the electric valve current is proportional to an actuating speed of the hydraulic actuating drive.

11. The vehicle steering system according to claim 1, wherein the desired-value generator comprises a unit configured to compensate for non-linearity between an actuating path of the hydraulic actuating unit and a steering angle of the steered vehicle wheels.

12. The vehicle steering system according to claim 11, wherein the control segment is proportional to a change rate of a desired value.

13. The vehicle steering system according to claim 12, wherein the regulating segment comprises a proportional segment and, above a threshold value of a regulating difference, a differential segment of the regulating difference.

14. The vehicle steering system according to claim 13, wherein the electric valve current is proportional to an actuating speed of the hydraulic actuating drive.

15. The vehicle steering system according to claim 14, wherein the desired-value generator is configured to operate as a function of driving speed such that, according to a product, the desired value is a function of a position of the manual steering device and the driving speed.

16. The vehicle steering system according to claim 1, wherein the desired-value generator is configured to be provided with an input for an autonomous control as a function of given parameters.

17. The vehicle steering system according to claim 16, wherein the control segment is proportional to a change rate of a desired value.

18. The vehicle steering system according to claim 17, wherein the regulating segment comprises a proportional segment and, above a threshold value of a regulating difference, a differential segment of the regulating difference.

19. A vehicle steering method, comprising the steps of:
   manually operating a steering device, connected to a desired-value generator controlling a hydraulic actuating drive operationally connected with the vehicle wheels via an electrically actuated valve with an electric valve current thereof dependent on a regulating segment determined by a desired-value actual-value comparison of steering angle or a quantity correlated therewith, and
   controlling the electric valve current as a function of a desired-value-dependent control segment to steer the vehicle wheels with a rough adjustment having no delay and precision adjustment taking place by way of the regulating segment,
   wherein the control segment is proportional to a chance rate of a desired value.

* * * * *